United States Patent
Feng

(10) Patent No.: US 11,641,796 B2
(45) Date of Patent: May 9, 2023

(54) LAWN MOWER AND CUTTING BLADE THEREOF

(71) Applicant: Globe (Jiangsu) Co., Ltd, Jiangsu (CN)

(72) Inventor: Shouchuan Feng, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 257 days.

(21) Appl. No.: 17/070,964

(22) Filed: Oct. 15, 2020

(65) Prior Publication Data
US 2021/0105937 A1   Apr. 15, 2021

(30) Foreign Application Priority Data

Oct. 15, 2019 (CN) .......................... 201910976584.9

(51) Int. Cl.
*A01D 34/73* (2006.01)
*A01D 101/00* (2006.01)

(52) U.S. Cl.
CPC .......... *A01D 34/73* (2013.01); *A01D 2101/00* (2013.01)

(58) Field of Classification Search
CPC ............................. A01D 34/73; A01D 2101/00
USPC .......................................................... 56/295
See application file for complete search history.

(56) References Cited

U.S. PATENT DOCUMENTS

| 4,977,735 | A | * | 12/1990 | Davis | ...................... | A01D 34/73 |
|---|---|---|---|---|---|---|
| | | | | | | 56/295 |
| 5,473,873 | A | | 12/1995 | Sheldon | | |
| 5,711,141 | A | | 1/1998 | Pitman et al. | | |
| 5,775,078 | A | * | 7/1998 | Warren | ................... | A01D 34/73 |
| | | | | | | 56/255 |
| 8,615,977 | B2 | | 12/2013 | Campione | | |
| 9,468,144 | B2 | | 10/2016 | Kurioka et al. | | |
| 2005/0229573 | A1 | | 10/2005 | Curran | | |
| 2006/0162310 | A1 | * | 7/2006 | Dittmer | ................. | A01D 34/73 |
| | | | | | | 56/289 |

FOREIGN PATENT DOCUMENTS

| DE | 20301311 U1 | * | 3/2003 | ............. A01D 34/73 |
|---|---|---|---|---|
| EP | 0757887 B1 | * | 5/2001 | |
| EP | 1312249 A1 | | 5/2003 | |
| FR | 2865610 A1 | * | 8/2005 | ............. A01D 34/73 |

OTHER PUBLICATIONS

Extended Search Report of Counterpart European Patent Application No. 20202121.8 dated Mar. 1, 2021.

* cited by examiner

*Primary Examiner* — Mahmoud Gimie

(57) ABSTRACT

The invention provides a blade and a lawn mower. The blade comprises a flat middle portion, and two end portions respectively disposed at two opposite ends of the middle portion, wherein a cutting edge is located on the end portion, and wherein each end portion includes a first end portion and a second end portion, and wherein the second end portion is located between the middle portion and the first end portion, and wherein along the longitudinal direction of the middle portion, the ratio of the length of the first end portion to the length of the blade in a horizontal plane is between 0.045 and 0.09. The blade and the lawn mower have advantages that grass can be smashed completely by the blade to achieve an optimal grass smashing effect, the structure is simple and the cost is low.

14 Claims, 2 Drawing Sheets

LAWN MOWER AND CUTTING BLADE THEREOF

CROSS-REFERENCE TO RELATED INVENTIONS

This invention is a US invention which claims the priority of CN invention Serial No. 201910976584.9, filed on Oct. 15, 2019, the disclosures of which are hereby incorporated by reference in their entirety.

TECHNICAL FIELD

The invention relates to a blade and a lawn mower having the blade, which belongs to the field of garden tools.

BACKGROUND ART

At present, lawn mowers on the market commonly have two types, lawn mowers with grass collection bags and lawn mowers without grass collection bags. Lawn mowers without grass collection bags are also called mulching mower. Compared to the lawn mowers, the mulching mower do not have grass collection bags. After the cutting, the grass clippings are distributed on the lawn. If the grass clippings are too large or clustered, they will cover the lawn, causing the lawn to grow poorly or die.

At present, the lawn mowers on the market have designed blades with various shapes and types in order to improve the performance of mulching, such as Honda's double-layer blades. However, this kind of blade has a complicated structure, a large size and a high cost. Moreover, due to the heavy weight, more power is needed. The lawnmower with low power will does not operate at rated power.

In view of this, it is necessary to improve the existing blades to solve the above problems.

SUMMARY OF INVENTION

An object of the present invention is to provide a blade, which has a better mulching performance, a simple structure and a low cost.

To achieve the above object, the present invention provides a blade for a lawn mower, comprises a flat middle portion; and two end portions respectively disposed at two opposite ends of the middle portion; wherein a cutting edge is located on the end portion, and wherein each end portion includes a first end portion and a second end portion, and wherein the second end portion is located between the middle portion and the first end portion, and wherein along the longitudinal direction of the middle portion, the ratio of the length of the first end portion to the length of the blade in a horizontal plane is between 0.045 and 0.09.

As an embodiment of the present invention, along the longitudinal direction of the middle portion, the ratio of the length of the first end portion to the length of the second end portion in the horizontal plane is between 0.25 and 0.5, and wherein the length of the middle portion is two times of the length of the second end portion in the horizontal plane.

As an embodiment of the present invention, the ratio of the length of the first end portion to the length of the second end portion in the horizontal plane is 0.33.

As an embodiment of the present invention, the length of the blade in the longitudinal direction of the middle portion is less than 43 cm.

As an embodiment of the present invention, two end portions are located at two opposite ends of the middle portion in a center-symmetric manner.

As an embodiment of the present invention, the first and second end portions are twisted relative to the middle portion along the longitudinal direction of the middle portion, and wherein the twisting direction of the first end portion is opposite to the twisting direction of the second end portion.

As an embodiment of the present invention, each end portion has a front surface and a rear surface opposite to the front surface, and wherein the cutting edge is located on the front surface and includes a first part located at the first end portion and a second part located at the second end portion, and wherein the first part of the cutting edge is lower than the second part of the cutting edge in height direction.

As an embodiment of the present invention, the rear surface has a first portion located on the first end portion and a second portion located on the second end portion, and wherein the first portion is higher than the second portion in height direction.

As an embodiment of the present invention, the second end portion twisted downwardly from the middle portion has a second slope surface located between the front and rear surfaces, and wherein the second part of the cutting edge is higher than the second portion of the rear surface in height direction.

As an embodiment of the present invention, the first end portion twisted upwardly from the second end portion has a first slope surface located between the front and rear surfaces, and wherein the first part of the cutting edge is lower than the first portion of the rear surface in height direction.

As an embodiment of the present invention, the first slope surface forms a first angle with respect to the middle portion, and the second slope surface forms a second angle with respect to the middle portion, and wherein the first angle is equal to the second angle.

As an embodiment of the present invention, wherein the first and second angles are within the range from 8 degree to 15 degree.

In order to achieve the above object, the present invention further provides a blade for a lawn mower including: a middle portion configured as a flat-plate shape; and two end portions respectively disposed at two opposite ends of the middle portion; wherein a cutting edge is located on the end portion, and wherein each end portion includes a first end portion and a second end portion, and wherein the second end portion is located between the middle portion and the first end portion, and wherein when the length of the blade is greater than 43 cm, the ratio of the length of the first end portion to the length of the blade along the longitudinal direction of the middle portion in a horizontal plane is less than or equal to 0.07.

The object of the present invention is also to provide a lawn mower, which has better grass breaking performance.

To achieve the above object, the present invention provides a lawn mower comprising: a body; a prime mover received in the body; a blade driven by the prime mover to cut grass and including: a flat middle portion; and two end portions respectively disposed at two opposite ends of the middle portion; wherein a cutting edge is located on the end portion, and wherein each end portion includes a first end portion and a second end portion, and wherein the second end portion is located between the middle portion and the first end portion, and wherein along the longitudinal direction of the middle portion, the ratio of the length of the first end portion to the length of the blade in a horizontal plane is between 0.045 and 0.09.

The beneficial effect of the present invention is that the blade of the present invention is provided with two end portions on both sides of the middle portion. The length of the first end portion in each end portion is defined to be small, preferably the ratio of the length of the first end portion to the length of the blade is between 0.045 and 0.09, so that when cutting the grass, even if it is applied to a low-power lawn mower, the blades after cutting can be fully broken to achieve the best grass-breaking effect.

DESCRIPTION OF EMBODIMENT

Figure 1:
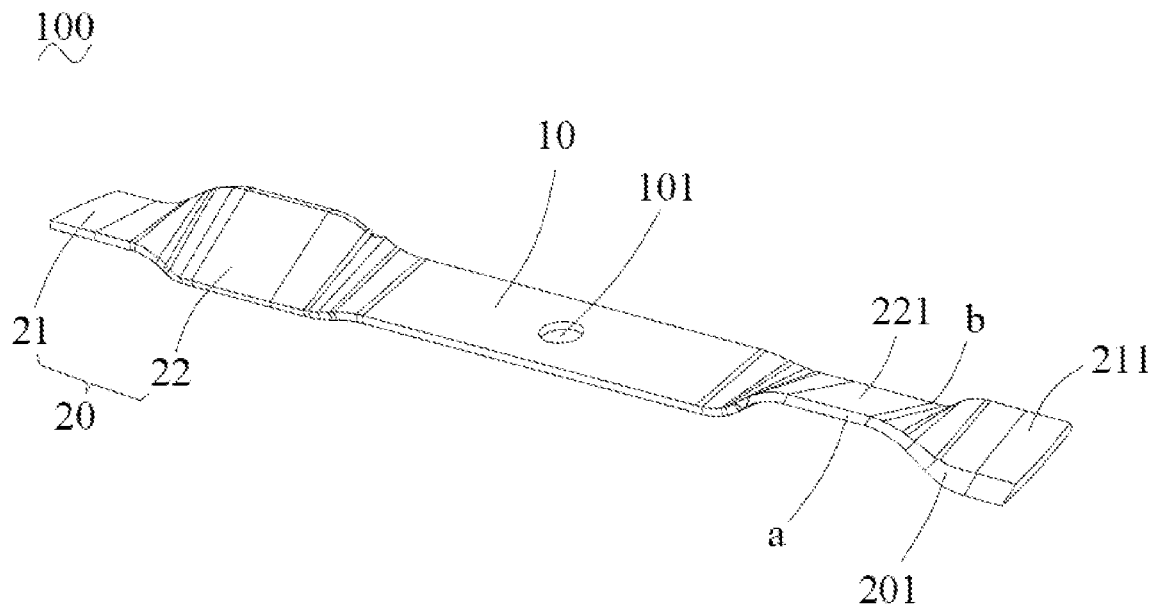
FIG. 1 is a perspective view of a blade of the present invention.

In order to make the objectives, technical solutions, and advantages of the present invention clearer, the following describes the present invention in detail with reference to the accompanying drawings and specific embodiment.

The invention discloses a blade 100, which can be used for a lawn mower, a walk-behind lawn mower or a garden tractor etc. for cutting the grass and further breaking the grass into debris. Taking a lawn mower as an example, since the blade 100 of the present invention can be used for any types of the lawn mower, the specific structure of the lawn mower is not limited. The specific structure and usage principle of the blade 100 will be described in detail as following, but it should not be limited to thereto.

As shown in FIG. 1 to FIG. 4, the blade 100 includes a flat middle portion 10 and end portions 20 respectively arranged on two opposite ends of the middle portion 10. The middle portion 10 is provided in an elongated rectangular shape, the blade 100 is mounting to a lawn mower through the middle portion 10. The end portion 20 is provided with a cutting edge 201 for cutting grass.

A mounting hole 101 is located at a central position of the middle portion 10 for a mounting shaft (not shown) of the lawn mower passing through to mount the blade 100 to the lawn mower. It can be understood that the mounting shaft may be fixedly connected to the blade 100 by bolts, or other methods which is not limited herein.

In general, the mounting shaft is coaxial with that of a motor of the lawn mower, so that when the motor rotates, the blade 100 can be driven to rotate. Of course, the mounting shaft may also be connected to a driving mechanism of the lawn mower through a gear or a belt, so that when the driving mechanism is started, the blade 100 may be driven by a gear or a belt.

The middle portion 10 is configured a flat shape and the two end portions 20 are disposed in a center-symmetric manner. Specifically, one end portion 20 can be overlapped with the other end portion 20 after being rotated 180 degrees in the horizontal direction, so as to ensure the blade 100 being rotated about the installation axis on a substantially horizontal plane without being biased and conveniently cut the grass into debris.

The end portion 20 and the middle portion 10 are integrally formed, and the materials of the two are the same, which can form a complete blade 100. Because the structures and materials of the two end portions 20 are the same, one of the end portions 20 will be described in detail in the following description section.

The end portion 20 includes a first end portion 21 and a second end portion 22 connecting the first end portion 21 to the middle portion 10. The second end portion 22 is connected to the middle portion 10 and the first end portion 21 is connected to the second end portion 22. Along a longitudinal direction of the middle portion 10, the ratio of the length of the first end portion to the length of the blade in a horizontal plane is between 0.045 and 0.09

Figure 2:
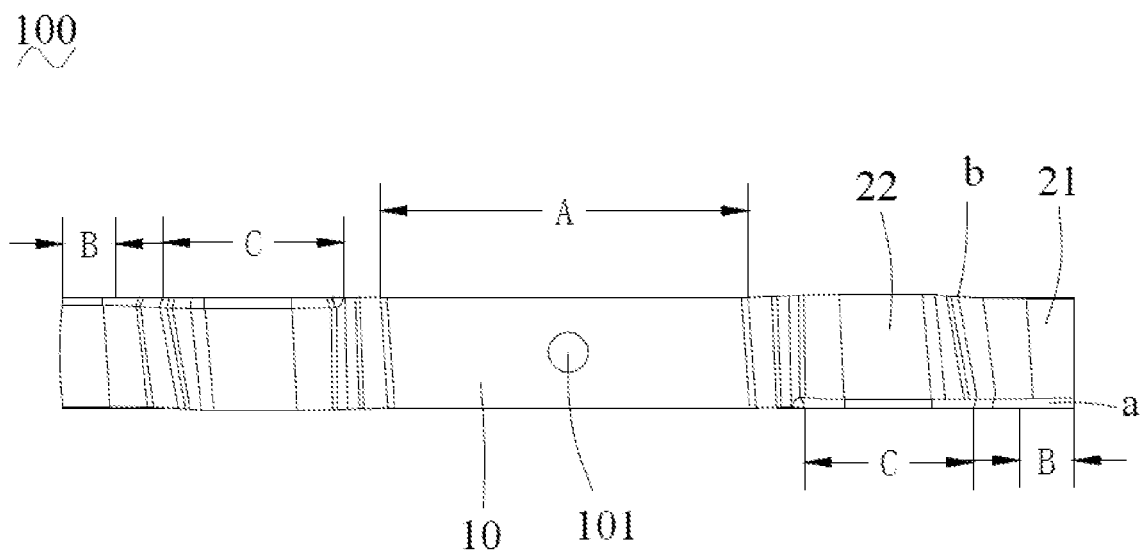
FIG. 2 is a top view of the blade shown in FIG. 1.

As shown in FIG. 2, in the longitudinal direction of the middle portion 10, the length of the middle portion 10 is defined as A, the length of the first end portion 21 is defined as B, and the length of the second end portion 22 is defined as C. When the overall length of 100 is less than 43 cm (about 17 inches), the ratio of the length B of the first end portion 21 to the length C of the second end portion 22 is between 0.25 and 0.5, preferably 0.33. The length A is approximately two times of the length C of the second end portion 22. When the overall length of the blade 100 is greater than 43 cm (about 17 inches), the length B of the first end portion 21 is less than or equal to 30 mm. The ratio of the length B of the first end portion to the length of the blade along the longitudinal direction of the middle portion in a horizontal plane is less than or equal to 0.07.

It can be understood that, whether the blade 100 is larger than 17 inches or the blade 100 is smaller than 17 inches, as long as the ratio of the length B of the first end portion 21 to the overall length of the blade 100 along the longitudinal direction of the middle portion in a horizontal plane is controlled between 0.045 and 0.09, the effect of crushing grass is perfect.

For example, when the blade 100 is smaller than 17 inches, the length A of the middle portion 10 may be set to 166.46 mm, the length C of the second end portion 22 may be set to 76.22 mm, and the length B of the first end portion 21 may be set to 24.63. mm. With this kind of set, the ratio of the length B of the first end portion 21 to the overall length of the blade 100 along the longitudinal direction of the middle portion in a horizontal plane is about 0.0669, and the ration of the length B of the first end portion 21 to the length C of the second end portion 22 along the longitudinal direction of the middle portion in a horizontal plane is 0.323. The length A of the middle portion 10 is about two times of the length C of the second end portion 22, which meets the above requirements.

Figure 3:
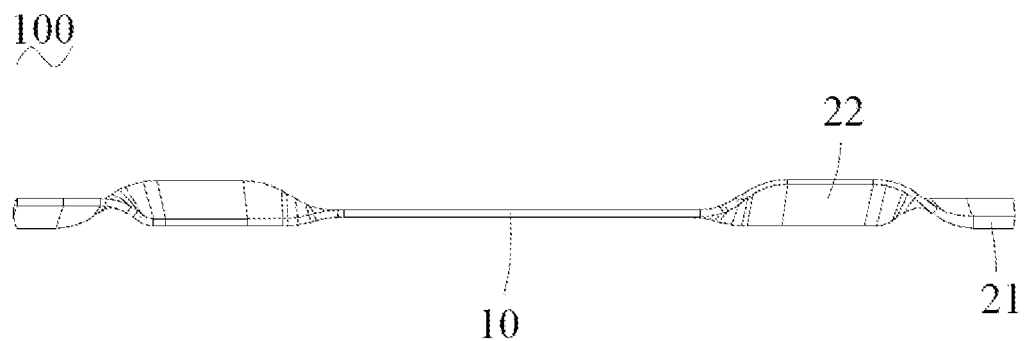
FIG. 3 is a side view of the blade shown in FIG. 1.

As shown in FIG. 1 and FIG. 3, in the longitudinal direction of the middle portion 10, the first end portion 21 and the second end portion 22 are both twisted relative to the middle portion 10, and the twisting direction of the first end portion 21 is opposite to the twisting direction of the second end portion 22. Specifically, one side of the cutting edge 201 of the end portion 20 is defined as a front surface a and the other side opposite to the cutting edge 201 is a rear surface b. The cutting edge (201) has a first part located at the first end portion (21) and a second part located at the second end portion (22). The rear surface (b) has a first portion located on the first end portion (21) and a second portion located on the second end portion (22). The front surface a of the first end portion 21 is lower than the rear surface b, so that the first end portion 21 forms a first slope surface 211 extending upwardly relative to the middle portion 10. The front surface a of the second end portion 22 is higher than the rear surface b, so that the second end portion 22 forms a second slope surface 221 extending downwardly relative to the middle portion 10. The cutting edge 201 of the end portion 20 forms a cutting-edge portion of the blade 100. The front surface a of the first end portion 21 and the second end portion 22 is provided with a cutting-edge portion, and the cutting-edge portion is located at a position facing the grass for cutting grass.

Figure 4:
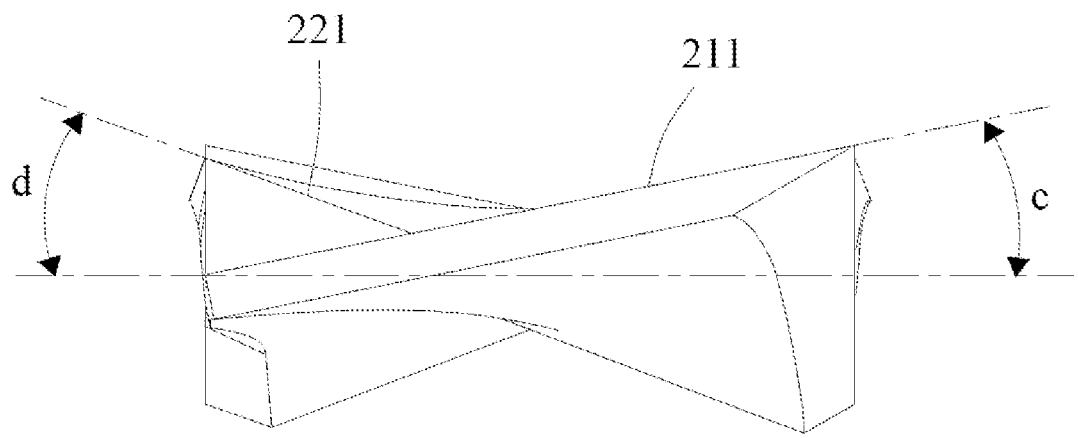
FIG. 4 is another angled side view of the blade shown in FIG. 1.

As shown in FIG. 4, the first slope surface 211 forms a first angle c with respect to the middle portion 10, and the second slope surface 221 forms a second angle d with respect to the middle portion 10. The first angle c is equal to the second angle d. Preferably, the first angle c and the second angle d are within the range from 8 degree to 15 degree, and preferably 11 degree.

Taking the end portion 20 on the right side of FIG. 1 as an example, when the blade 100 is used to cut the grass, the first slope surface 211 facing the grass is an uphill surface, so that the longer cut grass flows upwardly with the airflow along the direction of the uphill surface after cut by the first end portion 21. When the grass touches the bottom shell of the lawn mower, it will change its direction and flow downward. The end portion 20 on the left side will rotate to complete the secondary cutting of the grass and the grass rises upwardly with the airflow. With such continuous circulation, the grass can finally be cut into debris. It can be understood that, because the cutting edge 201 of the second end portion 22 is high, and the grass cut by the first end portion 21 flows upwardly with the airflow, so that the grass will be cut twice to broken into small grass clippings when the second end portion 22 of the other end portion 20 rotates and approaches the grass.

It should be noted that, because the second slope surface 221 of the second end portion 22 is a downhill slope, the air flows downwardly. The first slope surface 211 of the first end portion 21 is an uphill surface, which causes the air to flow upward, so that a high-pressure area will be formed above the rear end of the first end 21 and a low-pressure area will be formed above the rear end of the second end 22. Therefore, the cut grass can not only flow along the up and down circulating air flow, and further it can flow along the circulating air flow that is deviated to the left. And further, the longer grass cut by the first end portion 21 will follow the direction of the air flow and flow to the second end portion 22 for secondary cutting.

It can be seen that in order to ensure that the grass is sufficiently cut, the length B of the first end portion 21 must be sufficiently shorter than the length C of the second end portion 22. At this time, the mulching effect of the blade 100 reaches the best. In the prior art, the length of the grass after cutting is generally 5-7 cm, and after cutting with the blade 100 of the present invention, the length of the obtained grass is 2-3 cm, which can achieve the best grass-breaking effect and not cause a bad impact on the lawn.

In summary, the blade 100 of the present invention is provided with end portions 20 on opposite ends of the middle portion 10, and the length of the first end portion 21 in each end portion 20 is set to be small. Preferably, the ratio of the length of the first end portion 21 to the overall length of the blade 100 is between 0.045 and 0.09, so that the grass after cutting can be fully broken to achieve the best broken effect even if applied to a low-power lawn mower. At the same time, the blade 100 of the present invention has a simple structure and low cost.

The above embodiment is only used to illustrate the technical solution of the present invention and is not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A blade for a lawn mower, comprising:
    a flat middle portion; and
    two end portions respectively disposed at two opposite ends of the middle portion;
    wherein a cutting edge is located on the end portion, and wherein each end portion includes a first end portion and a second end portion, and wherein the second end portion is located between the middle portion and the first end portion, and wherein along the longitudinal direction of the middle portion, the ratio of the length of the first end portion- to the length of the blade in a horizontal plane is between 0.045 and 0.0669.

2. The blade according to claim 1, wherein two end portions are located at two opposite ends of the middle portion in a center-symmetric manner.

3. The blade according to claim 1, wherein the first and second end portions are twisted relative to the middle portion along the longitudinal direction of the middle portion, and wherein the twisting direction of the first end portion is opposite to the twisting direction of the second end portion.

4. The blade according to claim 2, wherein each end portion has a front surface and a rear surface opposite to the front surface, and wherein the cutting edge is located on the front surface and includes a first part located at the first end portion and a second part located at the second end portion, and wherein the first part of the cutting edge is lower than the second part of the cutting edge in height direction.

5. The blade according to claim 4, wherein the rear surface has a first portion located on the first end portion and a second portion located on the second end portion, and wherein the first portion is higher than the second portion in height direction.

6. The blade according to claim 5, wherein the second end portion twisted downwardly from the middle portion entirely forms a second slope surface located between the front and rear surfaces, and wherein the second part of the cutting edge is higher than the second portion of the rear surface in height direction.

7. The blade according to claim 6, wherein the first end portion twisted upwardly from the second end portion entirely forms a first slope surface located between the front and rear surfaces, and wherein the first part of the cutting edge is lower than the first portion of the rear surface in height direction.

8. The blade according to claim 7, wherein the first slope surface forms a first angle with respect to the middle portion, and the second slope surface forms a second angle with respect to the middle portion, and wherein the first angle is equal to the second angle.

9. The blade according to claim 8, wherein the first and second angles are within the range from 8 degree to 15 degree.

10. The blade according to claim 7, wherein along the longitudinal direction of the middle portion, the ratio of the length of the first end portion to the length of the second end portion in the horizontal plane is between 0.25 and 0.5, and wherein the length of the middle portion is two times of the length of the second end portion in the horizontal plane.

11. The blade according to claim 10, wherein the ratio of the length of the first end portion to the length of the second end portion in the horizontal plane is 0.33.

12. The blade according to claim 10, wherein the length of the blade in the longitudinal direction of the middle portion is less than 43 cm.

13. A blade for a lawn mower including:
a middle portion configured as a flat-plate shape; and
two end portions respectively disposed at two opposite ends of the middle portion;
wherein a cutting edge is located on the end portion, and wherein each end portion includes a first end portion and a second end portion, and wherein the second end portion is located between the middle portion and the first end portion, and wherein when the—length of the blade is greater than 43 cm, the length of the first end portion is less than or equal to 30 mm.

14. A lawn mower, comprising:
a body;
a prime mover received in the body;
a blade driven by the prime mover to cut grass and including:
a flat middle portion; and
two end portions respectively disposed at two opposite ends of the middle portion; wherein a cutting edge is located on the end portion, and wherein each end portion includes a first end portion and a second end portion, and wherein the second end portion is located between the middle portion and the first end portion, and wherein along the longitudinal direction of the middle portion, the ratio of the length of the first end portion- to the length of the blade in a horizontal plane is between 0.045 and 0.0669.

\* \* \* \* \*